United States Patent Office 2,764,568
Patented Sept. 25, 1956

---

2,764,568

WATER RESISTANT ADHESIVE

Raymond Landis Hawkins, Richmond, Va.

No Drawing. Application April 7, 1955,
Serial No. 500,037

18 Claims. (Cl. 260—17)

This invention relates to a new and useful improvement in a water resistant adhesive containing starch, polyvinyl alcohol and sodium carboxymethylcellulose, and to processes and articles adapted for use with such adhesive compositions. It also relates to dry compositions containing by weight from 35 to 60 parts of unswollen starch, from 40 to 65 parts of polyvinyl alcohol and from 5 to 11 parts of sodium carboxymethylcellulose, the total parts of the named ingredients being 100.

The invention further pertains to liquid water resistant adhesives produced by heating the aforesaid ingredients, in water, until the starch is swollen and the polyvinyl alcohol and sodium carboxymethylcellulose are dissolved. It further relates to the heating processes employed, to the processes in which a plurality of cellulosic plies are adhesively bonded with the aforesaid ingredients, and to the water resistant multiply structures so made.

It is well known in the art that the use of clay or other inert ingredients is commonly practiced in the manufacture of adhesives. It is also well known that the use of clay in adhesives acts as an extender and improves water resistance, but such clay material usually requires constant agitation to prevent the settling of the inert material. Furthermore, the use of clay gives rise to many inefficient machine operations, such, for instance, as the formation of insoluble clay adhesive masses that prevent smooth continuous adhesive film operations with respect to cellulose materials on such machines. The same clay adhesive masses also present definite maintenance problems such as "cleanups," in that they are very difficult to remove from the metallic machine parts, such for example, as adhesive kettles utilized in laminating machines. Still further, by the addition of clay or other inert materials generally used in the manufacture of adhesives, a greater quantity of such adhesive is required per unit of a finished product, thus increasing the final adhesive cost. Due to such high cost, it is a well known fact that most polyvinyl alcohol adhesives containing clay cannot be economically used for non-high water resistant requirement bonding.

It is therefore clearly obvious that due to such high costs a cheaper material or adhesive is required, such, for instance, as starch, in the fabricating of products not requiring high water resistant bonding. As a general rule most starch adhesives are not compatible with the polyvinyl alcohol-clay combinations, and thereby require a complete machine and mixing kettle "washup" when changing from a non-water resistant adhesive to a water resistant adhesive.

In view of the foregoing, the several objects of this invention are the provision of a low cost water resistant adhesive that contains no large percentage of an inert material, such as clay, one that contains no expensive addition agents nor requires heat treatment to obtain a water resistant adhesive film for joining cellulosic materials.

Another object of this invention is the provision of an adhesive containing addition agents that do not make an unstable solution of polyvinyl alcohol, and one that is capable of application to a cellulosic product at near boiling temperatures without excessive penetration into such product.

Other objects and features will more fully appear from the following discussion, description and examples:

It has been discovered that if a dry composition of matter containing, by weight, 35 to 60 parts of unswollen starch, 40 to 65 parts of polyvinyl alcohol, and 5 to 11 parts of sodium carboxymethylcellulose, the total parts of the named ingredients being 100, is heated in water until the starch has been swollen, and the other two ingredients dissolved, an adhesive is produced, which, when used to bond a plurality of cellulosic structures is not only exceptionally strong but is highly water resistant.

It is to be understood that in the polyvinyl alcohol used the amount of vinyl ester should not exceed 5%. It is preferred to use a polyvinyl alcohol which does not contain more than 1% vinyl ester residue, that is, 99% completely hydrolyzed polyvinyl alcohol.

It is also preferred to use polyvinyl alcohol of a high viscosity gel type, such that an aqueous adhesive composition, hereinafter described, at about 12% solids or lower will gel at room temperature on standing. Any polyvinyl alcohol having a viscosity range of between 5 centipoises and 80 centipoises at a 4% aqueous solution, by weight, at 20° centigrade may be used. It is preferred to use a polyvinyl alcohol having a viscosity of between 60 and 65 centipoises measured at a 4% aqueous solution, by weight, at 20° centigrade. Preferably, this gel structure should be accomplished as soon as the aqueous adhesive reaches room temperature or soon after being applied to the cellulosic plies that are being laminated.

In order to provide good machine application to circulation with respect to the liquid adhesive, the operation temperature should be held between 120° and 180° Fahrenheit. The hereinbefore mentioned gelling permits use of the aqueous adhesive at such extremely high temperatures without undue penetration into the cellulosic plies. The nature of the fibre formation in the cellulosic plies determines the proper temperature for the application of the aqueous adhesive.

The starch utilized may be a relatively pure product, or it may be any starchy material such as flour made from wheat, corn, tapioca, potatoes or the like.

The sodium carboxymethylcellulose used in this invention is preferably of the high viscosity type which gives measurable aid to the gelling characteristics of the adhesive. Any sodium carboxymethylcellulose having a viscosity at the lower limit of less than 18 centipoises measured at 2% aqueous solution, by weight, and 25° centigrade, and an upper limit of 2800 centipoises measured at a 1% aqueous solution, by weight, may be used. It is preferred to employ the highest viscosity type of sodium carboxymethylcellulose having a viscosity range of between 1300 and 2200 centipoises, measured at a 1% aqueous solution, by weight, at 25° centigrade.

In opposition to other added agents to polyvinyl alcohol which tend to chemically "tie-up" upon drying, in situ, within the cellulosic fibres, the water sensitive portion of polyvinyl alcohol, sodium carboxymethylcellulose unites with polyvinyl alcohol tending to orient by a physical chemical bond these water sensitive portions, so that they are no longer markedly affected by water.

In addition to the sodium carboxymethylcellulose, starch and polyvinyl alcohol, it is preferable to include, in the compounding of this invention, small amounts of an inorganic salt to aid the insolubilization of the polyvinyl alcohol after drying, in situ, within the cellulosic plies. The amount of such salts should not be so great as to produce precipitation of the polyvinyl alcohol in the liquid adhesive.

In order to improve the machining characteristics and the flow of the liquid adhesive, small amounts of aldehydes such as formaldehyde or paraformaldehyde are included in the composition of this invention.

It is preferable to use a preservative in the composition to prevent growth of fungi or bacteria in the starch, such preservatives may be benzoic acid, or other similar products that are well known in the art, and the use of such that do not detract from the adhesive and the machining characteristics of said adhesive.

The proportions of starch, polyvinyl alcohol, and sodium carboxy-methylcellulose are important in the composition of this invention. On a dry basis before the starch is swollen, the proportions should range, by weight, of from 35 to 60 parts of starch, 40 to 65 parts of polyvinyl alcohol and 5 to 11 parts of sodium carboxymethylcellulose, the total parts of the named constituents being 100. It is preferable to use, by weight, dry basis, 40 parts of unswollen starch, 48 parts of polyvinyl alcohol, 9 parts of sodium carboxy-methylcellulose, 2 parts of ammonium sulphate, 5/10 of a part of paraformaldehyde and 5/10 part of a preservative.

To make the liquid adhesive from the hereinbefore described dry composition, the latter is stirred in water and heated to a temperature of between 180° to 200° Fahrenheit. The proportion of water used should be such as to yield a finished solids concentrate of 10 to 12%, by weight. To achieve the 12% solids concentration 12 parts of dry composition is "cooked" with 88 parts of water, the total parts being 100 after "cooking." The liquid adhesive may be prepared and applied to the cellulosic plies as a continuous operation or may be held in storage separately, for substantial periods of time before use. Since this adhesive is run hot at elevated temperatures, any gelling that may occur in storage will be eliminated during the preheating process before application.

In other methods and processes practiced in the manufacture of adhesives containing polyvinyl alcohol, starch and clay, it is normal to expect yields or uses of from 2 to 6 pounds, or more, dry basis, of adhesive per 1000 square feet per glue line in the lamination of multiply cellulose structures. In this invention, liquid adhesives prepared at 10 to 12% solids, by weight, with water, will require ½ to 1 pound, dry basis, of adhesive per 1000 square feet per glue line. It is to be understood that this invention requires positive pressure to the multiply cellulose structure at the time of uniting the separate adhesive coated plies, or as soon thereafter as practical.

The practice of this invention will be more fully understood by the following illustration:

*Example*

A dry adhesive composition was prepared by mixing the following ingredients, by weight: 40 parts of unswollen starch, 48 parts of polyvinyl alcohol having a viscosity of 60 centipoises at 20° centigrade in a 4% aqueous solution, 9 parts of sodium carboxy-methylcellulose having a viscosity of 2000 centipoises at 25° centigrade in a 1% aqueous solution.

A liquid adhesive was produced from the dry mixture as follows:

| | Pounds |
|---|---|
| Water | 4,500 |
| Dry adhesive | 500 |

To 3,800 pounds of water, 500 pounds of the dry mixture was added during continuous agitation. The mixture was then heated by direct steam to about 200° Fahrenheit and held at this temperature for a half hour. During the heating 600 pounds of condensation water was thus added. An additional 100 pounds of water was then added to the "cooked" mixture to bring the total water to 4,500 pounds. The liquid adhesive was then pumped directly to the laminating machine which applied an adhesive film respectively to one side of a plurality of kraft plies (multiply cellulose structure) at an application temperature of approximately 180° Fahrenheit. The separate adhesive coated plies were then passed between two pressure rollers weighing approximately 5 to 7 tons, in a continuous operation. The multiply structure was completely bonded as taken from the laminating machine at a rate of 365 feet per minute. The dry adhesive consumption was .61 pounds per 1000 square feet of the structure produced.

Samples of the structure produced were immersed in water at room temperature for periods of from 24, 48 hours and to 2 weeks. Upon examination of the samples during such periods, the adhesive bond strength was found to be higher than the paper strength with no ply separation.

With the foregoing illustration, discussion and description, it is to be understood that this inventions is not to be limited to the exact compositions, ingredients and processes, but is to be broadly interpreted with respect to the law of equivalents.

Having described this invention, what is claimed is:

1. A dry composition containing a mixture consisting of, by weight, 35 to 60 parts of unswollen starch, from 40 to 65 parts of polyvinyl alcohol, and from 5 to 11 parts of sodium carboxy-methylcellulose, the total parts of the named ingredients being 100.

2. A dry composition containing a mixture consisting of, by weight, from 35 to 60 parts of unswollen starch, from 40 to 65 parts of polyvinyl alcohol of a type having a viscosity between 5 and 60 centipoises, measured at a 4 percent aqueous solution, by weight, at 20° centigrade, from 5 to 11 parts of sodium carboxymethylcellulose of a type having a voscosity whose lower limit is less than 18 centipoises at a 2 percent aqueous solution, by weight, at 25° centigrade, and whose upper limit is 2,800 centipoises at a 1 percent aqueous solution, by weight, at 25° centigrade, the total parts of the named constituents being 100.

3. A dry composition containing a mixture consisting of, by weight, 43 parts of unswollen starch, 48 parts of polyvinyl alcohol of a type having a viscosity of 60 centipoises at a 4 percent aqueous solution, by weight, at 20° centigrade, 9 parts of sodium carboxymethylcellulose of a type having a viscosity of 2000 centipoises at a 1 percent aqueous solution, by weight, at 25° centigrade, the total parts of the named constituents being 100.

4. A dry composition containing a mixture consisting of, by weight, 41 parts of unswollen starch, 48 parts of polyvinyl alcohol of a type having a viscosity of 60 centipoises at a 4 percent aqueous solution, by weight, at 20° centigrade, 9 parts of sodium carboxymethylcellulose of a type having a viscosity of 2000 centipoises at a 1 percent aqueous solution, by weight, at 25° centigrade and 2 parts ammonium sulfate, the total parts of the named constituents being 100.

5. A dry composition containing a mixture consisting of, by weight, 40.5 parts of unswollen starch, 48 parts of polyvinyl alcohol of a type having a viscosity of 60 centipoises at a 4 percent aqueous solution, by weight, at 20° centigrade, 9 parts of sodium carboxymethylcellulose of a type having a viscosity of 2000 centipoises at a 1 percent aqueous solution, by weight, at 25° centigrade, 2 parts of ammonium sulfate, and .5 parts of paraformaldehyde, the total parts of the named constituents being 100.

6. A dry composition containing a mixture of, by weight, 40 parts of unswollen starch, 48 parts of polyvinyl alcohol of a type having a viscosity of 60 centipoises at a 4 percent aqueous solution, by weight, at 20° centigrade, 9 parts of sodium carboxymethylcellulose of a type having a viscosity of 2000 centipoises at a 1 percent aqueous solution, by weight, at 25° centigrade, 2 parts of ammonium sulfate, .5 parts of paraformaldehyde and .5 parts of a preservative, the total parts of the named ingredients being 100.

7. A liquid solution of adhesive quality comprising an aqueous dispersion of swollen starch, polyvinyl alcohol and sodium carboxymethylcellulose, the total solid content of the solution being between 1 and 12 per cent, by weight, the proportions of the constituents being, by weight, on a dry basis, 35 to 60 parts of unswollen starch, 40 to 65 parts of polyvinyl alcohol, and 5 to 11 parts of sodium carboxymethylcellulose, the total parts of the named constituents being 100.

8. A liquid solution of adhesive quality comprising an aqueous dispersion of swollen starch, polyvinyl alcohol and sodium carboxymethylcellulose, the total solids content of the solution being between 1 and 12 per cent, by weight, the proportions of the constituents being, by weight, on a dry basis, 35 to 60 parts of unswollen starch, 40 to 65 parts of polyvinyl alcohol of a type having a viscosity of between 5 and 60 centipoises, measured at a 4 per cent aqueous solution, by weight, at 20° centigrade, from 5 to 11 parts of sodium carboxymethylcellulose of a type having a viscosity whose lower limit is less than 18 centipoises at a 2 per cent aqueous solution, by weight, at 25° centigrade, and whose upper limit is 2800 centipoises at 1 per cent aqueous solution, by weight, at 25° centigrade, the total parts of the named ingredients being 100.

9. A liquid solution of adhesive quality comprising an aqueous dispersion of swollen starch, polyvinyl alcohol, and sodium carboxymethylcellulose, the total solids content of the solution being between 1 and 12 per cent, by weight, the proportions of the ingredients being, by weight, on a dry basis, 43 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose of a type having a viscosity of 2000 centipoises at a 1 per cent aqueous solution, by weight, at 25° centigrade, the total of the named constituents being 100.

10. A liquid solution of adhesive quality comprising an aqueous dispersion of swollen starch, polyvinyl alcohol, sodium carboxymethylcellulose and ammonium sulfate, the total solids content of the solution being between 1 and 12 per cent, by weight, the proportions of the constituents being, by weight, on a dry basis, 41 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose, of a type having a viscosity of 2000 centipoises at a 1 per cent aqueous solution, by weight, at 25° centigrade, and 2 parts of ammonium sulfate, the total of the named ingredients being 100.

11. A liquid solution of adhesive quality comprising an aqueous dispersion of swollen starch, polyvinyl alcohol, sodium carboxymethylcellulose, ammonium sulfate and paraformaldehyde, the total solids content of the solution being between 1 and 12 per cent, by weight, the proportions of the constituents being, by weight, on a dry basis, 40.5 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose of a type having a viscosity of 2000 centipoises, at a 1 per cent aqueous solution, by weight, at 25° centigrade, 2 parts of ammonium sulfate, and .5 part of paraformaldehyde, the total of the named constituents being 100.

12. A liquid solution of adhesive quality comprising an aqueous dispersion of swollen starch, polyvinyl alcohol, sodium carboxymethylcellulose, ammonium sulfate, paraformaldehyde and a suitable preservative, the total solid content of the solution being between 1 and 12 per cent, by weight on a dry basis the proportions of the constituents being, by weight, 40 parts of unswollen starch, 48 parts of polyvinyl alcohol of type having a viscosity of 60 centipoises at a 4 per cent aqueous solution, by weight, at 20° centigrade, 9 parts sodium carboxymethylcellulose of a type having a viscosity of 2000 centipoises at a 1 per cent aqueous solution, by weight, at 25° centigrade, 2 parts of ammonium sulfate, .5 part of paraformaldehyde and .5 part of a suitable preservative, the total of the named ingredients being 100.

13. In a process for producing a liquid of adhesive quality, the steps consisting of dispersing and heating in water a dry composition containing a mixture of, by weight, 35 to 60 parts of unswollen starch, 40 to 65 parts of polyvinyl alcohol, and 5 to 11 parts of sodium carboxymethylcellulose, the total parts of the named ingredients being 100.

14. In a process for producing a liquid of adhesive quality, the steps consisting of dispersing and heating in water, a dry composition containing, by weight, a mixture of from 35 to 60 parts of unswollen starch, from 40 to 65 parts of polyvinyl alcohol of a type having a viscosity between 5 to 60 centipoises, measured at a 4 per cent aqueous solution, by weight, at 20° centigrade, from 5 to 11 parts of sodium carboxymethylcellulose of a type having a viscosity whose lower limit is less than 18 centipoises at a 2 per cent aqueous solution, by weight, at 25° centigrade, and whose upper limit is 2800 centipoises at a 1 per cent aqueous solution, by weight, at 25° centigrade, the total parts of the named ingredients being 100.

15. In a process for producing a liquid of adhesive quality, the steps consisting of dispersing and heating in water, a dry composition containing, by weight, a mixture of 43 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose of a type having a viscosity of 2000 centipoises at a 1 per cent aqueous solution, by weight, at 25° centigrade, the total parts of the named constituents being 100.

16. In a process for producing a liquid of adhesive quality, the step consisting of dispersing and heating in water, a dry composition containing, by weight, a mixture of 41 parts of unswollen starch, 48 parts of polyvinyl alcohol of a type having a viscosity of 60 centipoises, at a 4 per cent solution, by weight, at 20° centigrade, 9 parts of sodium carboxymethylcellulose of a type having a viscosity of 2000 centipoises at a 1 per cent aqueous solution, by weight, at 25° centigrade and 2 parts of ammonium sulfate, the total parts of the named constituents being 100.

17. In a process for producing a liquid of adhesive quality, the steps consisting of dispersing and heating in water, a dry composition containing, by weight, a mixture of 40.5 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose of a type having a viscosity of 2000 centipoises at a 1 per cent aqueous solution, by weight, at 25° centigrade, 2 parts of ammonium sulfate, and 15 parts of paraformaldehyde, the total parts of the named ingredients being 100.

18. In a process for producing a liquid of adhesive quality, the steps consisting of dispersing and heating in water, a dry composition containing, by weight, a mixture of 40 parts of unswollen starch, 48 parts of polyvinyl alcohol of a type having a viscosity of 60 centipoises at a 4 per cent aqueous solution, by weight, at 20° centigrade, 9 parts of sodium carboxymethylcellulose of a type having a viscosity of 2000 centipoises at a 1 per cent aqueous solution, by weight, at 25° centigrade, 2 parts of ammonium sulfate, .5 part paraformaldehyde, and .5 part of a preservative, the total parts of the named ingredients being 100.

References Cited in the file of this patent
UNITED STATES PATENTS 1,682,293   Lilienfeld _____ Aug. 28, 1928

(Other references on following page)

UNITED STATES PATENTS

| | | |
|---|---|---|
| 2,256,853 | Schwartz | Sept. 23, 1941 |
| 2,310,961 | Kropa | Feb. 16, 1943 |
| 2,346,644 | Bauer et al. | Apr. 18, 1944 |
| 2,524,008 | Deney | Sept. 26, 1950 |
| 2,613,167 | Cone | Oct. 7, 1952 |

FOREIGN PATENTS

| | | |
|---|---|---|
| 894,088 | France | Mar. 6, 1944 |

OTHER REFERENCES

Scientific Section, National Paint Varnish & Lacquer Ass'n. Inc., Washington, D. C., "Sodium Carboxymethylcellulose," Circular 688, August 26, 1944, pp. 191–194.

Chem. & Engin. News, "Starch Adhesives," vol. 22, No. 17, September 10, 1944, pp. 1482–1484.